UNITED STATES PATENT OFFICE

ROBERT EMANUEL SCHMIDT, OF ELBERFELD, GERMANY, ASSIGNOR TO GENERAL ANILINE WORKS, INC., OF NEW YORK, N. Y., A CORPORATION OF DELAWARE

PROCESS OF SPLITTING OFF SULPHO GROUPS FROM ANTHRAQUINONE SULPHONIC ACID DERIVATIVES

No Drawing. Original application filed April 13, 1926, Serial No. 101,780, and in Germany April 17, 1925. Divided and this application filed June 6, 1927. Serial No. 197,010.

I have found new and useful improvements in processes of splitting off sulpho groups from anthraquinone sulphonic acid derivatives.

If substituted anthraquinone sulphonic acids are treated with reducing agents two types of reduction products are obtained. In strongly alkaline solution leuco compounds are obtained of which the generally accepted formula is

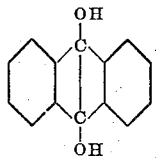

the other substituents being omitted. These leuco compounds revert easily into the parent material by oxidation in caustic alkali solution as for instance by oxygen from the air; they behave like typical vat dyestuffs.

I have now found that by reducing certain substituted anthraquinone sulphonic acids in substantially neutral solution, i. e., in slightly acid, neutral or weakly alkaline solutions, different reduction products are obtained. Such weakly alkaline solutions are for instance aqueous solutions of soda ash, potassium carbonate, pyridine, etc. Caustic alkali ammonia, etc., are also adaptable for use, provided they are employed in very dilute solutions. These new reduction products, which will be described further on, are distinguished from the above leuco compounds by the fact that their alkaline solutions are not readily oxidized by air to form the parent material. They are however oxidized in acid solution, as for instance by means of persulphates into the corresponding anthroquinone sulphonic acids. For convenience sake and inasmuch as I can not assign definite structural formulæ to these novel reduction products, I will designate them by the name "hydro compounds".

The leuco compounds can be converted into the hydro compounds by the action of weak alkali such as soda ash, pyridine, diluted caustic alkali solutions, etc.

I have now found that these hydro compounds will, with the greatest facility, split off one sulpho group, which is eliminated as sulphurous acid or a salt thereof. This clearly distinguishes my new process from heretofore known means of eliminating sulpho groups from anthraquinone sulphonic acids. The reaction in those cases is one of hydrolysis by which the sulpho group is eliminated in the form of sulphuric acid.

This reaction occurs particularly well with hydroxy-, amino-, substituted amino-anthraquinone-sulphonic acids, or such anthraquinone sulphonic acids containing several like or different substituents, as is illustrated in the examples given further on. Other substituents in the anthraquinone nucleus do not seem to influence materially this reaction. I wish it to be understood that under the term anthraquinone sulphonic acid derivatives as used herein I understand such compounds as contain at least one of the groups, hydroxy, amino or substituted amino; i. e., alkyl amino, or several like or different of the above substituents.

A particularly advantageous method of achieving this reaction is to treat the hydro-compounds with alkaline agents. A sulpho group is eliminated in the form of sulphurous acid and an anthraquinone derivative is formed containing one sulphonic acid group less than the original compound. The reaction may be explained by admitting that one of the additional hydrogen atoms attaches itself to the —$SO_3H$ group, which is split off as sulphurous acid, the other one replaces the so eliminated sulpho group.

I have no exact knowledge of the structural formula of the hydro product, but as a mere matter of illustrating the invention a formula of the following type might be assumed:

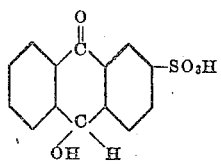

the other substituents being omitted. The reaction would then proceed as follows, the arrows indicating the migration of the hydrogen atoms:

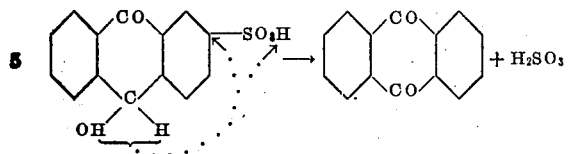

Other desmotrope formulæ for the hydro compounds may be as well justified; it is even possible that the hydrogenation takes place at one of the benzene nuclei; the reaction could then be represented by a graphical equation as follows:

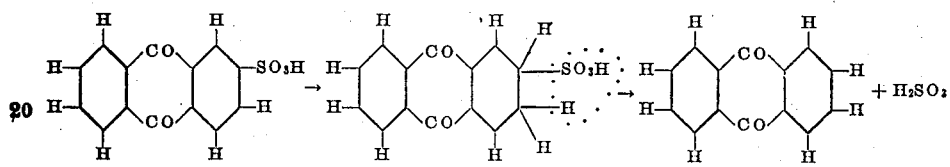

The reaction proceeds in a very easy and smooth way. It is finished in a few moments at room temperature, by using a slight excess of caustic soda in dilute water solution. Weaker alkalies such as ammonia or soda ash can likewise be used; the reaction then takes more time at room temperature, but is quite speeded up by increasing the temperature. Heating of water solutions of the alkali metal salts of the hydro compounds is, in many cases, sufficient to eliminate the sulpho group. In this case an alkali metal bisulphite is formed and I wish it to be understood that alkali metal bisulphite and other similar salts are included in the term alkaline agents as used herein.

When starting from pure anthraquinone sulphonic acids of the type described herein, the desulphonated products are obtained directly in a pure and mostly crystalline form.

The ease with which this novel reaction proceeds in dilute acid, neutral or weakly alkaline solutions under ordinary conditions constitutes a remarkable technical advance over the heretofore known processes of eliminating sulpho groups from anthraquinone sulphonic acids. It is furthermore applicable in numerous instances when the old processes fail to work or give rise to undesirable by-products.

The hydro compounds can be isolated and obtained in substance, but it is usually not necessary to do this. The solutions of the hydro compounds as obtained directly by reducing the anthraquinone sulphonic acid compounds, can be treated immediately with an alkaline agent; this is a very valuable simplification of my novel process.

Anthraquinone sulphonic acids containing several sulpho groups can be so treated as to split off successively one after the other sulpho group. In reacting upon such material with sufficient amounts of a reducing agent and an alkaline agent, the splitting off of the several sulpho groups is achieved in a single operation.

Another convenient reagent which eliminates a sulpho group from the hydro compounds is concentrated mineral acid, particularly sulphuric acid. This reaction is achieved by dissolving the hydro compounds in concentrated sulphuric acid and heating this solution. Sulphur dioxide is evolved and when the reaction mass is poured into water, the desulphonated product separates. This reaction can be improved by the addition of boric acid.

The hydro compounds are very conveniently obtained by treating the anthraquinone sulphonic acid compounds with alkali metal hydrosulphites, but other reducing agents, as for instance zinc dust in diluted acetic acid, are just as well suited to produce this reaction.

The following examples will further illustrate my invention, the parts being by weight, but I wish it to be understood that my invention is not limited to the particular substance, nor to the exact reaction conditions mentioned:

*Example 1.*—10 parts of the hydro compound of the p-diamino-anthrarufin-disulphonic acid as obtained according to Example 2 of the co-pending application Serial No. 101,780, Patent No. 1,782,747, November 25, 1930, by reducing para-diamino-anthrarufin-2-6-disulphonic acid in a sodium carbonate solution with sodium hydrosulphite, at a temperature of about 30 to 40° C. are dissolved in 150 parts of concentrated sulphuric acid, 5 parts of boric acid are added; and the mixture heated on the water bath. The yellow color of the solution gradually turns blue and sulphur dioxide is evolved. After the color does not change any more, the reaction mass is poured into 1500 parts of water and the p-diamino-anthrarufin-monosulphonic acid separates and is filtered off.

*Example 2.*—The hydro compound of the 1-amino-4-hydroxy-anthraquinone-3-sulphonic acid obtained according to Example 1 of the co-pending application Serial No. 101,-780. Patent No. 1.782,747, November 25, 1930, by reducing 1-amino-4-hydroxy-anthraquinone-3-sulphonic acid in an aqueous solution with sodium hydrosulphite at room temperature is dissolved in concentrated sulphuric acid and with addition of boric acid heated on the water bath, the originally yellow color of the solution turns bluish-red with a vermilion red fluorescence, indicating the formation of the 1-4-amino-hydroxy-anthraquinone. This is isolated in the usual way.

In the table below additional anthraquinone compounds are given, which have been obtained by the use of my invention, from their corresponding sulphonic acids:

| Sulphonic acid | Products obtained |
|---|---|
| Quinizarine-2-sulphonic acid | Quinizarine. |
| Purpurine-3-sulphonic acid | Purpurine. |
| Anthrarufin-2-6-disulphonic acid | Anthrarufine. |
| 1-amino-anthraquinone-2-sulphonic acid. | 1-amino-anthraquinone. |
| 1-5-diamino-anthraquinone-2-6-disulphonic acid. | 1-5-diamino-anthraquinone-2-sulphonic acid. |
| 1-5-diamino-anthraquinone-2-6-disulphonic acid. | 1-5-diamino-anthraquinone. |
| 1-amino-4-bromoanthraquinone-2-sulphonic acid. | 1-4-amino-bromo-anthraquinone. |

The 1-5-diamino-anthraquinone-2-sulphonic acid is hardly obtainable by any other process than the one described herein.

The p-diamino-chrysazine-2-7-disulphonic acid as well as the p-diamino-anthrarufine-2-7-disulphonic acid when subjected to my novel process will produce the corresponding sulphonic acids or diamino-dihydroxy-anthraquinone.

This application is a division of my copending application Serial No. 101,780, filed April 13, 1926.

It is to be understood that under the term "anthraquinone sulphonic acid derivatives" as used in the claims following hereafter, I understand such compounds as contain at least one of the groups, hydroxy, amino or substituted amino, i. e., alkyl amino, or several similar to or different from the above substituents.

Furthermore, under the term "hydro-compounds" I understand such compounds as are obtainable by reducing the substituted anthraquinone sulphonic acids in a substantially neutral or weakly alkaline solution as more fully described in the specification. The hydro compounds are distinguished from the corresponding leuco compounds by the fact that their alkaline solution is not readily oxidized by means of air to form the parent material. Furthermore, they will, with greatest facility, split off a sulpho group which is eliminated as sulphurous acid or a salt thereof.

I claim:

1. Process of splitting off a sulpho group from an anthraquinone sulphonic acid derivative which comprises adding sodium hydrosulphite to an aqueous solution of para-diamino-anthrarufin-2-6-disulphonic acid, at a temperature of about 30 to 40° C. until the color of the solution has changed to an orange-yellow, separating the hydro compound thus obtained and heating it on the water bath with concentrated sulphuric acid in which boric acid is dissolved.

2. Process which comprises adding an alkali metal hydrosulphite in substantially neutral solution to an anthraquinone-β-sulphonic acid substituted at least once by an amino group and a hydroxy group standing in para-position to each other and attached to the same nucleus as that to which the sulphonic group is attached, whereby there is formed a hydrogenated compound of said anthraquinone compound whose alkaline solution is not readily oxidized by air to form the parent material, and heating the so-formed compound with concentrated sulphuric acid.

3. Process which comprises adding an alkali metal hydrosulphite in substantially neutral solution to an anthraquinone-β-sulphonic acid substituted at least once by an amino group and a hydroxy group standing in para-position to each other and attached to the same nucleus as that to which the sulphonic group is attached, whereby there is formed a hydrogenated compound of said anthraquinone compound whose alkaline solution is not readily oxidized by air to form the parent material, and heating the so-formed compound with concentrated sulphuric acid in which boric acid is dissolved.

In testimony whereof, I affix my signature.

ROBERT EMANUEL SCHMIDT.